US012673351B2

(12) United States Patent
Riconosciuto et al.

(10) Patent No.: US 12,673,351 B2
(45) Date of Patent: Jul. 7, 2026

(54) AUTOMATED PROCESS AND METHOD FOR MATERIAL SEPARATION AND RECYCLING

(71) Applicant: Republic Services Intellectual Property Holding, LLC, Phoenix, AZ (US)

(72) Inventors: John Joseph Riconosciuto, West Chicago, IL (US); Peter J. Keller, Phoenix, AZ (US); Prabhu Soundarrajan, Phoenix, AZ (US); Henry Zhong-Yin Jiang, Phoenix, AZ (US); Matthew J. Augustson, Phoenix, AZ (US)

(73) Assignee: REPUBLIC SERVICES INTELLECTUAL PROPERTY HOLDINGS, LLC, Phoenix, AZ (US)

( * ) Notice: Subject to any disclaimer, the term of this patent is extended or adjusted under 35 U.S.C. 154(b) by 102 days.

(21) Appl. No.: 17/950,548

(22) Filed: Sep. 22, 2022

(65) Prior Publication Data

US 2023/0089544 A1     Mar. 23, 2023

Related U.S. Application Data

(60) Provisional application No. 63/247,118, filed on Sep. 22, 2021.

(51) Int. Cl.
*B09B 3/35*          (2022.01)
*B03B 9/06*          (2006.01)
(Continued)

(52) U.S. Cl.
CPC .................. *B09B 3/35* (2022.01); *B03B 9/06* (2013.01); *B03B 9/061* (2013.01); *B09B 3/32* (2022.01);
(Continued)

(58) Field of Classification Search
CPC ......... B09B 3/32; B09B 3/35; B09B 2101/75; B09B 2101/85; B03B 9/06; B03B 9/061;
(Continued)

(56) References Cited

U.S. PATENT DOCUMENTS

| | | | |
|---|---|---|---|
| 5,536,373 A | 7/1996 | Carlson et al. | |
| 5,871,161 A * | 2/1999 | Nishibori | ............... D21B 1/028 |
| | | | 241/DIG. 38 |

(Continued)

FOREIGN PATENT DOCUMENTS

| | | |
|---|---|---|
| EP | 0711368 | 5/1996 |
| WO | 20190195257 | 10/2019 |

OTHER PUBLICATIONS

PICVISA Machine Vision Systems, S.L. of the United Kingdom titled "Artificial Intelligence: The Recycling Revolution" (Feb. 14, 2020), available at https://recyclinginside.com/artificial-intelligence-the-recycling-revolution/.

(Continued)

*Primary Examiner* — Michael McCullough
*Assistant Examiner* — Jessica L Burkman
(74) *Attorney, Agent, or Firm* — Stradley Ronon Stevens & Young, LLP

(57)          ABSTRACT

An automated process for separating and recycling a broad mix of waste material including industrial and commercial streams. The process begins by collecting the broad mix of waste material. Optionally, the broad mix of waste material is sorted to remove contamination from the broad mix of waste material. Next, the broad mix of waste material is coarsely shredded. Plastic film is removed from the broad mix of waste material, creating a stream of plastic film and a separate stream of dirty cardboard. Residual plastic is separated from the cardboard stream and included either in the plastic stream or in an independent third stream. The (Continued)

process yields separate streams of a film-rich recycled plastic and a clean recycled cardboard having a purity of at least about 95%. Also provided are a related system and at least one computer-readable non-transitory storage medium embodying software for performing the process.

16 Claims, 8 Drawing Sheets

(51) Int. Cl.

| | |
|---|---|
| *B09B 3/32* | (2022.01) |
| *B29B 17/02* | (2006.01) |
| *B29B 17/04* | (2006.01) |
| *B09B 101/75* | (2022.01) |
| *B09B 101/85* | (2022.01) |
| *B29K 67/00* | (2006.01) |

(52) U.S. Cl.
CPC .......... *B29B 17/02* (2013.01); *B29B 17/0412* (2013.01); *B09B 2101/75* (2022.01); *B09B 2101/85* (2022.01); *B29B 2017/022* (2013.01); *B29B 2017/0241* (2013.01); *B29B 2017/0279* (2013.01); *B29K 2067/00* (2013.01)

(58) Field of Classification Search
CPC ................ B29B 17/02; B29B 17/0412; B29B 2017/022; B29B 2017/0241; C08J 11/06
See application file for complete search history.

(56) References Cited

U.S. PATENT DOCUMENTS

| | | | |
|---|---|---|---|
| 10,661,984 B2 | 5/2020 | Chan et al. | |
| 11,123,939 B2 | 9/2021 | Chan et al. | |
| 2020/0338789 A1* | 10/2020 | Whitaker | ............ B29B 17/0412 |
| 2021/0170707 A1 | 6/2021 | Chan et al. | |
| 2021/0197421 A1* | 7/2021 | Haider | ................ G01N 21/645 |
| 2022/0180501 A1 | 6/2022 | Perez et al. | |
| 2023/0398718 A1* | 12/2023 | Heyde | ...................... B08B 3/08 |

OTHER PUBLICATIONS

"Standards for a Sustainable Future," https://verra.org (2021).

* cited by examiner

AUTOMATED PROCESS AND METHOD FOR MATERIAL SEPARATION AND RECYCLING

RELATED APPLICATION

This application claims the benefit of priority to U.S. Provisional Patent Application Ser. No. 63/247,118, filed on Sep. 22, 2021, the contents of which are incorporated in this application by reference.

TECHNICAL FIELD

The present disclosure relates generally to the problem of separating and recycling waste material and, more particularly, to separating and recycling a broad mix of waste material including industrial and commercial streams.

BACKGROUND OF THE DISCLOSURE

Recycling is the process of turning used materials and waste into new products. There are many reasons to recycle. Among those reasons are a reduction in the air, water, and land pollution that is caused by discarded or burnt waste, meaning that the air we breathe, the water we drink, and the land on which we live is safer and healthier. The recycling process is one of the most effective ways that we can help preserve our planet and make sure that it is a healthy place to live. Recycling further reduces the amount of waste sent to landfills and incinerators. Recycling still further reduces our reliance on increasingly scarce natural resources and raw materials such as timber, water, and minerals when manufacturing new products. It takes less energy to recycle used materials than it does to produce items with raw materials, and saving energy is good both for the environment and for consumers because recycling reduces the prices of products. Recycling also creates jobs for people, as recycling companies employ many thousands of workers all over the world. Therefore, as the reasons outlined above show, the recycling process helps more than just the environment.

We should all recycle everything that is capable of going through the recycling process. Much of our household and commercial (e.g., industrial) waste can be broken down and reprocessed to make new products. Some common materials that can and should be recycled include: (1) paper such as newspapers, paper towels, magazines, and cardboard packaging; (2) metal such as aluminum and steel cans, metal food containers, and foil; (3) plastic such as bottles, carrier bags, tubs, food containers, and wrappers; and (4) glass such as bottles, jars, and food containers.

Recycling includes the following three steps, which create a continuous loop, represented by the familiar recycling symbol comprising three arrows that form a circle. The first step is collection and processing of recyclables. There are several methods for collecting recyclables, including curbside collection, drop-off centers, and deposit or refund programs. After collection, recyclables are sent to a materials recovery facility ("MRF") to be sorted, cleaned, and processed into materials that can be used in manufacturing. Recyclables are bought and sold just like raw materials would be, and prices go up and down depending on supply and demand in the United States and the world. This disclosure focuses on the step of collecting and processing recyclables.

In the second step of the recycling process, products are manufactured with recycled materials either collected from a recycling program or from waste recovered during the normal manufacturing process. More and more products are being manufactured with recycled content and product labels will sometimes include how much of the content was from recycled materials. Finally, in the third step of the recycling process, consumers close the recycling loop by buying new products made from recycled materials. Consumers should look both for products that contain recycled content and for products that can be easily recycled.

The first step of the recycling process, collecting and processing recyclables, has historically been accomplished manually. Across the United States, there are over 20,000 workers who process recyclable materials after those materials have been collected by city or private waste collection crews and taken to the local MRF. At the MRF, glass, paper, and metals are sorted into different materials streams by machines and by hand, with recycling workers pulling items off conveyor belts for sorting as the items pass.

MRFs have been dependent on hand sorting to ensure that the highest quality and cleanest recyclable materials are extracted. Workers also sort out mistakes (non-recyclable or hazardous materials), which are removed and sent to waste disposal facilities. Hand sorting ensures that materials collected for recycling can be most efficiently turned into high-grade feedstock that fetches the best prices in the marketplace for recyclable material. Thus, the work that recycling sorters do is essential to the overall functioning of the process. Yet their work is also time consuming. There is a need to automate the step of collecting and processing recyclables to increase productivity.

Methods have been implemented, or at least suggested, toward automation. For example, waste matter of various categories normally is packaged as tightly compacted bales of considerable size and weight. The main advantages of baling solid waste materials are: (1) ease of handling, transport, and storage; (2) bales are compatible with the recycling machines to recycle any waste which can be reused, like reusable plastic and reusable paper; and (3) the storage of baled waste is more compact by which optimal usage of the storage space can be done for stocking the waste.

The nature of these tightly compacted and very heavy bales presents serious problems, however, in processing the miscellaneous tightly compacted contents of the bales in an economical and efficient manner such that the recyclable materials recovered from the miscellaneous types of waste in the bale are of a high quality and free of contaminants with minimal damage to those materials. U.S. Pat. No. 5,536,373 titled "Recycle Processing of Baled Waste Material" (and its counterpart, European Patent No. 0711368) attempts to address those problems for certain baled waste material. Disclosed is a method of processing baled waste material containing waste paper having fibers contaminated to various degrees. The method is intended to recover usable cellulosic fiber pulp from the bale. The bale contents are impregnated with a fiber swelling and debonding fluid by enclosing the bale within a closed chamber and subjecting the chamber and contained bale to multiple pressure environmental conditions, which preferably include a vacuum, while submerging the bale in the debonding fluid. The impregnated bale contents are allowed to soak for a sufficient period that the lesser degree contaminated fibers become swollen after which the bale is subjected to a sufficiently low degree of pulping agitation as initiates separation of the swollen fibers without significant damage to the fibers and which does not significantly decrease the sheet size of higher degree contaminated bonded fibers and other contaminants. The agitated bale contents are separated in a screen separator into a pulp-containing slurry and a reject mass of higher degree contaminated, unswollen fibers and contaminants. If the reject mass contains a significant degree of fibrous material, it is compressed into bale form and again subjected to a multiple pressure liquid impregnation treatment in a closed chamber after which the multiple pressure impregnated bale is subjected to the same or similar recycling operations in separating out the fiber pulp slurry.

This automated procedure has its own disadvantages. The procedure adds time and cost to the recycling process. For example, time is required for the waste paper contents of a tightly compacted bale to be impregnated, subjected to pressure, soaked, agitated, and separated. In addition, after separation of the relatively uncontaminated cellulosic fibers of waste paper contained in the bales, it has been the general practice to dispose the non-debonded and contaminant containing or contaminant coated fibrous matter to landfill along with the non-fibrous waste matter and contaminants contained in the bales.

To overcome the shortcomings of the known technology, a new automated process (or method) for material separating and recycling is provided by the present disclosure. An object of the present disclosure is to meet the need for separating and recycling a broad mix of waste material including industrial and commercial streams. A related object is to meet the need for separating OCC (cardboard), plastic film, and flexible packaging. Another object is to achieve a high quality of recyclable material regardless of the source. A need remains in the recycling market for a process that can aggregate mixed waste materials and separate them into pure streams of clean recycled materials suitable for manufacturing new products.

It is still another object of the present disclosure to improve the processing of waste materials containing a mix of various types (OCC, film, plastic pallets, packaging crates, buckets, drums, and others) for recycling the contents of the mixed waste materials. Another object is to recover the maximum amount of high quality recyclable materials from the various categories and types of mixed waste materials with a minimum degradation or damage to the recovered materials.

A further object of the present disclosure is to leverage economies of scale and aggregate mixed plastics from several recycling facilities and sort into purified recycled streams for end-customers. A still further object is to reduce capital expenditure and operating expenditure at recycling facilities. Yet another object is to homogenize curbside programs across feeder markets regardless of local recycling processing capabilities through centralizing complexity at the recycling facility location.

SUMMARY OF THE DISCLOSURE

To achieve these and other objects and to meet these and other needs, and in view of its purposes, the present disclosure provides an automated process for separating and recycling a broad mix of waste material including industrial and commercial streams. The process begins by collecting the broad mix of waste material. Optionally, the broad mix of waste material is sorted to remove contamination from the broad mix of waste material. Next, the broad mix of waste material is coarsely shredded. Plastic film is removed from the broad mix of waste material, creating a stream of plastic film and a separate stream of dirty cardboard. Residual plastic is separated from the stream of dirty cardboard and included either in the plastic stream or in an independent third stream. The process yields separate streams of a film-rich recycled plastic and a clean recycled cardboard having a purity of at least about 95%. Also provided are a related system and at least one computer-readable non-transitory storage medium embodying software for performing the process.

The related system for separating and recycling a broad mix of waste material including industrial and commercial streams, includes the following components. At least one of a stationary compactor and a self-contained compactor collect the broad mix of waste material. An optional sorter sorts the broad mix of waste material to remove contamination from the broad mix of waste material. A shredder coarsely shreds the broad mix of waste material. A grabber removes plastic film from the broad mix of waste material, creating a stream of plastic film and a separate stream of dirty cardboard. At least one of an optical sorter and an air separation device separates residual plastic from the stream of dirty cardboard and includes that residual plastic either in the plastic stream or in an independent third stream, wherein separate streams of a film-rich recycled plastic and a clean recycled cardboard having a purity of at least about 95% are created.

The at least one computer-readable non-transitory storage medium embodies software that is operable when executed to: (a) collect a broad mix of waste material including industrial and commercial streams; (b) optionally sort the broad mix of waste material to remove contamination from the broad mix of waste material; (c) coarsely shred the broad mix of waste material; (d) remove plastic film from the broad mix of waste material, creating a stream of plastic film and a separate stream of dirty cardboard; and (f) separate residual plastic from the stream of dirty cardboard and include that residual plastic either in the plastic stream or in an independent third stream, wherein separate streams of a film-rich recycled plastic and a clean recycled cardboard having a purity of at least about 95% are created.

The present disclosure teaches a function of automation with a defined process which presents considerable advantages over known technology. The advantages including scalability, higher mix recyclable recovery, greater circularity, safety, and efficiency. It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE DISCLOSURE

In this specification and in the claims that follow, reference will be made to a number of terms which shall be defined to have the following meanings ascribed to them.

The term "about" means those amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is described to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point. Whether or not a numerical value or end-point of a range in the specification recites "about," the numerical value or end-point of a range is intended to include two embodiments: one modified by "about" and one not modified by "about." It will be further understood that the end-points of each of the ranges are significant both in relation to the other end-point and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for components and steps, and ranges thereof, are for illustration only; they do not exclude other defined values or other values within defined ranges. The components and method steps of the disclosure include those having any value or any combination of the values, specific values, more specific values, and preferred values described.

The indefinite article "a" or "an" and its corresponding definite article "the" as used in this disclosure means at least one, or one or more, unless specified otherwise. "Include," "includes," "including," "have," "has," "having," "comprise," "comprises," "comprising," or like terms mean encompassing but not limited to, that is, inclusive and not exclusive.

Figure 1:
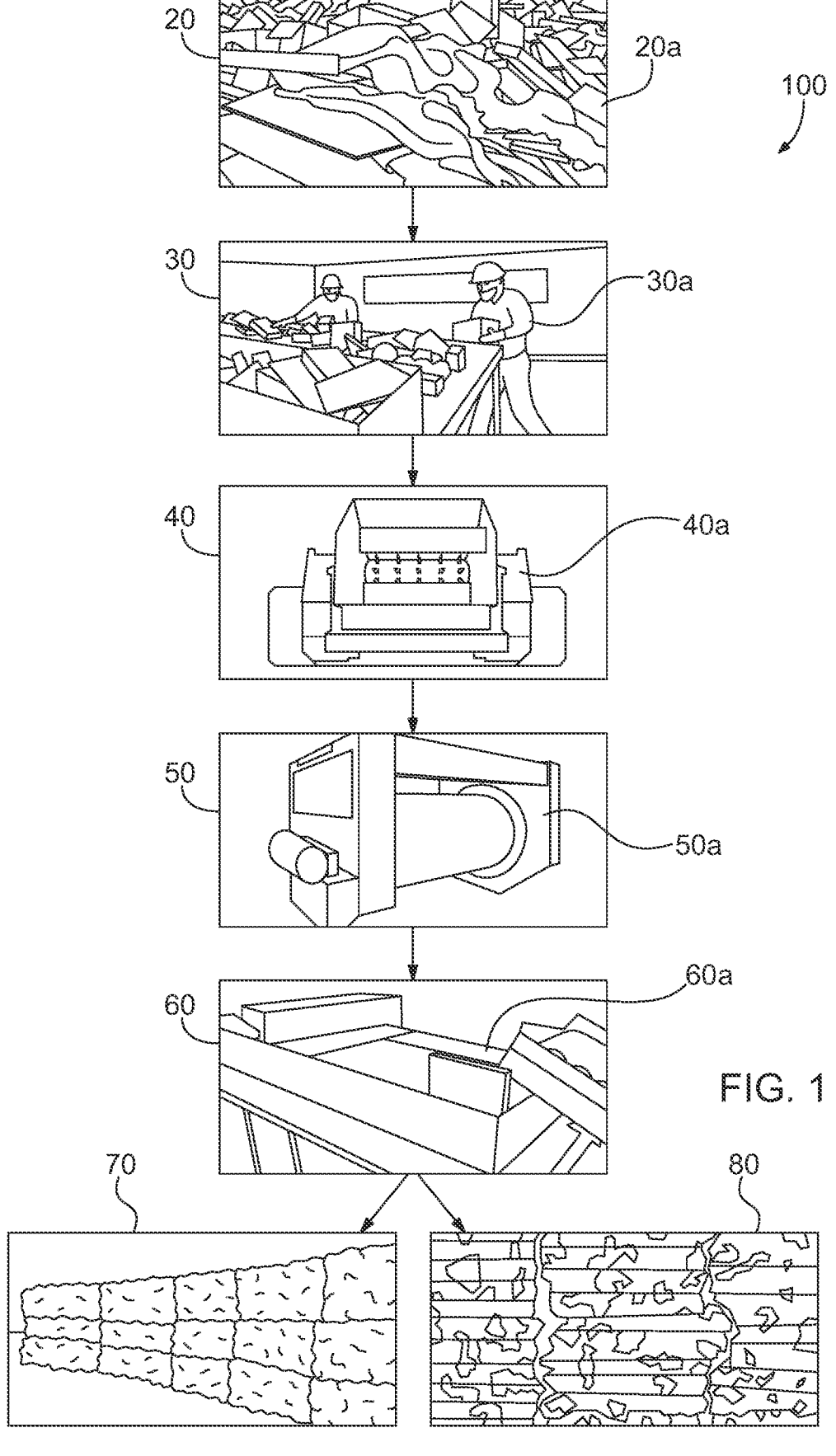
FIG. 1 shows an overview or flow chart illustrating an automated process for separating and recycling a broad mix of waste material, including industrial and commercial streams, according to the present disclosure.

Referring now to the drawing, in which like reference numbers refer to like elements throughout the various figures that comprise the drawing, FIG. 1 shows an overview or flow chart illustrating an automated process 100 for separating and recycling a broad mix of waste material including industrial and commercial streams. More specifically, the mixed waste material can include cardboard and distribution plastics such as linear low density polyethylene (LLDPE) and low density polyethylene (LDPE) films, polypropylene (PP) strapping, high density polyethylene (HDPE) crates, polystyrene (PS) foam, and the like. A brief discussion of recycling efforts directed to those two main streams follows to provide context for further disclosure about the process 100 and its advantages.

A. Cardboard (OCC) Recycling

The term "cardboard" refers to post-use corrugated packaging material. Industry insiders know this product as Old Corrugated Cardboard/Containers (OCC). Recycling and waste haulers often use the term OCC in reference to cardboard. Corrugated cardboard can easily be recognized by its multiple layer structure: a fluted or wavy middle layer is disposed between sheets of paper. This structure keeps corrugated board light and gives it the strength to carry products. If OCC is kept dry and clean, recycling is straightforward as long as all non-paper materials such as bubble wrap, wood skids, plastic bags, plastic wrapping, and closed-cell extruded polystyrene foam (XPS) are removed. (Styrofoam is a trademarked brand of XPS manufactured by The Dow Chemical Company.)

The size and type of business can have a strong bearing on OCC generation. Studies suggest that this material can represent as much as 40 percent or more of solid waste generated in a retail establishment and 15 percent or more of solid waste generated in an office setting. A small convenience store is estimated to produce between 700-1,000 lbs of OCC per month, while grocery supermarkets generate between 8-30 tons and department stores generate 8-20 tons during that time span.

For small businesses which generate a comparatively small amount of OCC, bundling OCC manually, storing the loose OCC in a suitable container, and having it collected by a hauler is ideal. On the other hand, businesses which generate a large amount of OCC often use large storage containers and compact or bale it using an industrial baler for the efficient transportation of OCC to recycling centers. One emerging technology is the use of shredding in combination with compaction or baling to increase the density of material for transport.

Recycling corrugated containers is relatively straightforward. It involves diverting old cardboard from waste streams, the elimination of contaminants, and the flattening or compressing of material to promote ease of handling, storing, delivering the stock to a paper production mill or processor where it is processed into different paper products such as recycled paperboard, the center fluting of corrugated boxes, and unbleached craft paperboard. On average, a corrugated box contains roughly 50 percent recycled fiber. About 51 percent of OCC is used to make new corrugated board, while 11.5 percent is used for boxboard materials such as cereal boxes. About 32 percent of recycled OCC is exported.

Depending upon the amount of OCC generated, the selling relationship will vary. Large generators may deal directly with paper companies, while mid-level generators may deal with recycling companies, and very small generators may sell to smaller operators acting to aggregate material for sale. No matter how much OCC is generated, it is important to recycle.

There are a number of benefits to recycling OCC instead of discarding it. Recycling OCC reduces energy and water usage and the production of greenhouse gas and certain air pollutants like total reduced sulfur (TRS), volatile organic chemicals (VOCs), and hazardous air pollutants (HAP). The recycling of cardboard also reduces demand for virgin timber. It takes approximately three tons of trees to manufacture just one ton of virgin cardboard. Recycling helps reduce waste tipping fees as well. The recycling of one ton of cardboard saves more than nine cubic yards of landfill space.

B. Plastics Recycling

Plastics are inexpensive, lightweight, and durable materials, which can readily be molded into a variety of products that find use in a wide range of applications. As a consequence, the production of plastics has increased markedly over the last 60 years. Unfortunately, current levels of plastics usage and disposal generate several environmental problems. About 4 percent of world oil and gas production, a non-renewable resource, is used as feedstock for plastics and a further 3-4 percent is expended to provide energy for their manufacture. A major portion of plastics produced each year is used to make disposable items of packaging or other short-lived products that are discarded within a year of manufacture. These two observations alone indicate that our current use of plastics is not sustainable. In addition, substantial quantities of discarded end-of-life plastics are accumulating as debris in landfills and in natural habitats worldwide because of the durability of the polymers involved.

Recycling is one of the most important actions currently available to reduce these impacts and represents one of the most dynamic areas in the plastics industry today. Recycling provides opportunities to reduce oil usage, carbon dioxide emissions, and the quantities of waste requiring disposal. Although plastics have been recycled since the 1970s, the quantities that are recycled vary geographically, according to plastic type and application. Recycling of packaging materials has seen rapid expansion over the last decades in a number of countries. Advances in technologies and systems for the collection, sorting, and reprocessing of recyclable plastics are needed to create new opportunities for recycling, and with the combined actions of the public, industry, and governments it may be possible to divert the majority of plastic waste from landfills to recycling over the next decades.

The process 100 disclosed in this document and illustrated in FIG. 1 offers one of the needed advances in technologies and systems. For example, polyester and polyolefin are two categories of plastic. The difference between polyolefin and polyester is that polyolefin is a polymer made by the polymerization of an olefin and polyester is any polymer whose monomers are linked together by ester bonds. Recyclers rarely, if ever, handle both types of plastic. The process 100 enables recyclers to handle both.

The process 100 also enables conversion of film plastics that have been challenging to recycle due to manual separation (as done in conventional recycling). Current single-stream recycling facilities generate 3-4 broad streams of plastics, with comparatively high levels of plastics cross-contamination. Plastics manufacturers are narrowly focused on specific types of plastics based on their respective targeted products (e.g., polyethylene terephthalate bottlers view HDPE as "residue" in the stream). Plastics manufacturers currently sort these broader streams of plastics for desired plastic content but throw away other forms of valuable plastic. The market is missing a player who can aggregate mixed plastics and separate the aggregate into pure plastic streams to supply plastics manufacturers—unlocking value for currently discarded plastics.

C. The Process Recycles Mixed Waste Materials

FIG. 1 is flow chart that summarizes the steps of the example automated process 100. Those steps include the following:

Step 20: Collect a broad mix of waste material 20A;

Step 30: Sort to remove contamination from the broad mix of waste material 20A;

Step 40: Coarsely shred the decontaminated (sorted) waste material 20A;

Step 50: Remove (e.g., pull) plastic film from the waste material 20A, creating a stream of plastic film and a stream of dirty OCC;

Step 60: Separate residual plastic from the OCC stream and include that residual plastic either in the plastic stream or in an independent third stream;

Step 70: Create film-rich recycled plastic; and

Step 80: Create clean recycled OCC.

Details about each of the steps are provided below.

The first step 20 of the process 100 is to collect the broad mix of waste material 20A. The first step 20 may be accomplished using a receiver box or container, having a large top that can be opened and closed, which is connected to a compactor. The structures used to dump the waste into the compactor can vary greatly, depending on the physical space available, the type of waste being dumped, and the volume of waste being deposited. Suitable structures include ground fed, chute fed, hoppers, doghouses, walk-on decks, and loading docks.

Figure 2A:
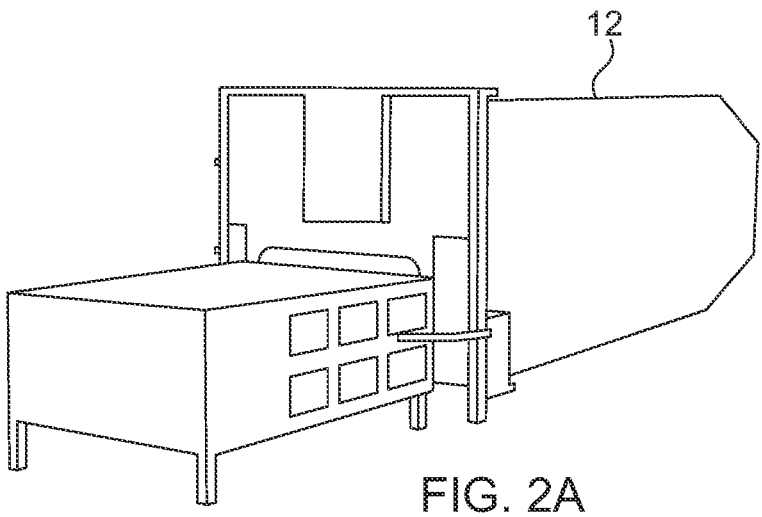
FIG. 2A depicts an example embodiment of a stationary compactor that can be used in the process according to the present disclosure.
Figure 2B:
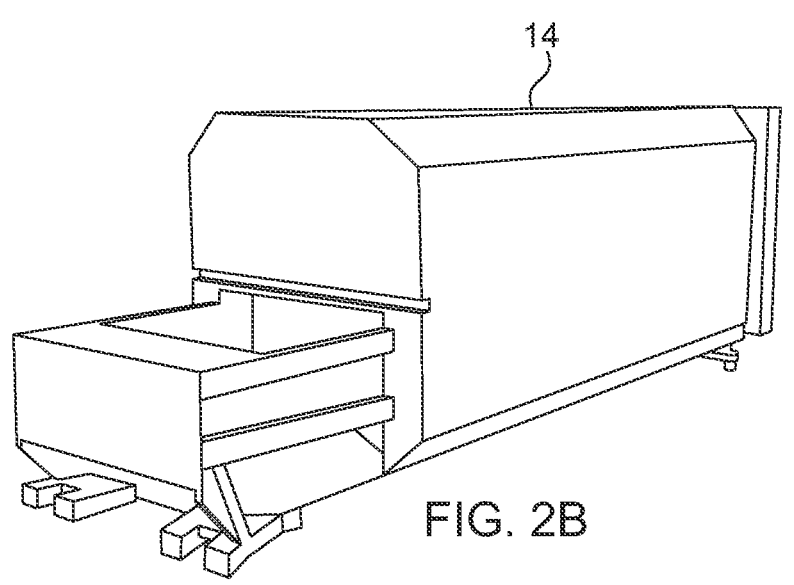
FIG. 2B depicts an example embodiment of a self-contained compactor that can be used in the process according to the present disclosure.

There are two basic types of industrial compactors: stationary compactors and self-contained compactors. FIG. 2A depicts an example embodiment of a stationary compactor 12, and FIG. 2B depicts an example embodiment of a self-contained compactor 14, each of which can be used in the first step 20 of the process 100. Like most industrial compactors, the stationary compactor 12 and the self-contained compactor 14 work generally in the same way. Waste is deposited into the compactor 12, 14 until it is full and no more waste can be added. An operator runs the compactor 12, 14, engaging a ram to push the waste into an attached container. The ram extends a certain depth into the container, compacting the waste into a much smaller volume. When the container can hold no more compacted waste, a waste hauler is contacted to empty the contents of the container and transport the compacted waste. The process then begins all over again.

The stationary compactor 12 is typically used when there is dry waste, such as wood, metal, and other non-recyclable materials in need of disposal. The stationary compactor 12 is usually anchored to the ground in a fixed position. When emptied, the container is removed from the stationary compactor 12 and the waste is dumped and transported.

The self-contained compactor 14 is typically used when there is liquid present in the waste. The self-contained compactor 14 is permanently attached to the container and there is often a sump system to remove the liquid waste safely. When the unit is full, the entire self-contained compactor 14 is loaded onto a truck for transportation.

Compactors 12, 14 are perfect for compressing recyclable materials before they are picked up by a waste management or recycling company. They are particularly helpful for scrap metal recycling, cardboard recycling, and plastic recycling. By incorporating the compactors 12, 14 in the first step 20, the process 100 automatically and directly compacts OCC, plastic, and film in a common container.

Figure 2C:
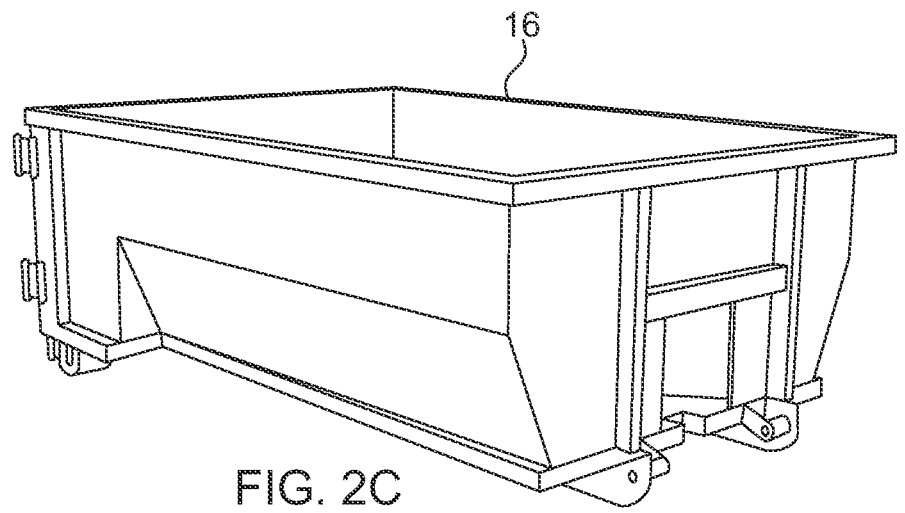
FIG. 2C depicts an example embodiment of a relatively large, open-top container that can be used in the process according to the present disclosure.
Figure 2D:
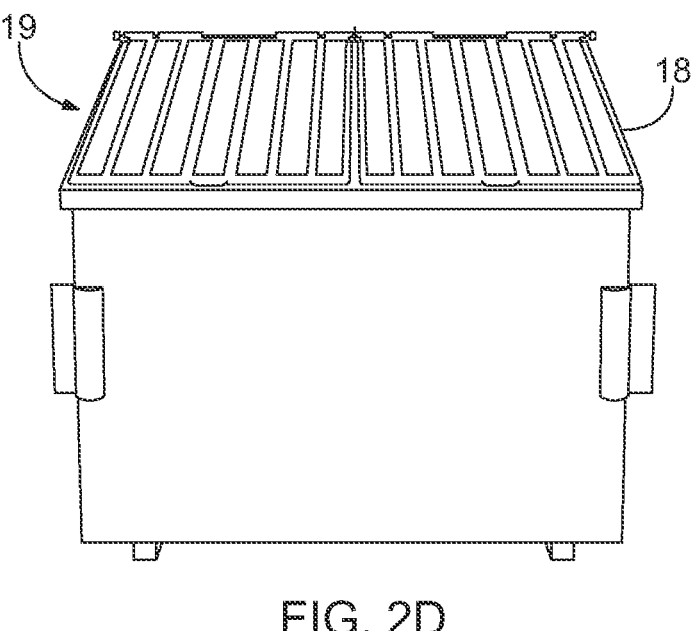
FIG. 2D depicts an example embodiment of a relatively small container having a top that can be used in the process according to the present disclosure.

Rather than compacting OCC, plastic, and film in the compactors 12, 14, the first step 20 of the process 100 may simply collect and store the broad mix of waste material 20A. FIG. 2C depicts an example embodiment of a relatively large, open-top container 16 that can be used in the process 100. FIG. 2D depicts an example embodiment of a relatively small container 18 having a top 19 that can be used in the process 100. The container 18 may have wheels to facilitate movement. A suitable container 18 is a bin or a dumpster, which is a type of movable waste container designed to be brought and taken away by a special collection vehicle or that a specially designed truck lifts, empties into its hopper, and lowers, on the spot.

As illustrated in FIG. 1, the second step 30 of the process 100 involves a manual removal from the broad mix of waste material 20A of contamination. Example contaminants include ammunition, paint, automotive fluids, car batteries, pesticides, and other hazardous waste that can poison, corrode, explode, or burst into flame when handled improperly. Other example contaminants include ceramics; mirrors; laboratory and Pyrex glass; syringes, needles, sharps, and medical waste; liquids in containers; and food waste. Certain non-recyclable plastics may constitute contaminants because stable, profitable markets do not currently exist for such plastics. A sorter 30A, which may be a machine or (as illustrated) a person, performs the second step 30. The second step 30 is optional but preferrable.

The third step 40 of the process 100 involves coarsely shredding the waste material 20A (from which contamination has been removed if the optional second step 30 has been implemented). The third step 40 can be accomplished using a shredder 40A. The shredder 40A is a heavy-duty tool that can shred the variety of components that comprise the waste material 20A. The shredder 40A may be floor-standing or attach to a wall. The shredder 40A includes metal blades that cut through the waste material 20A. This occurs as the waste material 20A enters the shredder 40A from underneath. The waste material 20A is then turned into small pieces by powerful rotating drums on either side of the blade assembly. After processing, the broken chunks of waste material 20 are sent out of the shredder 40A via an exhaust chute. In some applications, a dust collector is provided on the shredder 40A.

In the fourth step 50 of the process 100, an industrial grabber 50A is used to pull plastic film from the waste material 20A. Plastic film is typically defined as any plastic less than about 0.010 inches thick. The majority of plastic films are made from polyethylene resin and are readily recyclable if the material is clean and dry. The result of the process 100 after completing the fourth step 50 is that two, separate recycling streams are created. One stream includes the plastic film and the other stream includes dirty OCC.

The fifth step 60 of the process 100 involves separating residual plastic from the OCC stream. The residual plastic is then included either in the plastic stream or in an independent third stream. There are a number of possible ways to perform the fifth step 60. In one embodiment, as illustrated in FIG. 1, an optical sorter 60A is used. Optical sorting (sometimes called digital sorting) is the automated process of sorting solid products using cameras, lasers, or both cameras and lasers. Depending on the types of sensors used and the software-driven intelligence of the image processing system, optical sorters can recognize the color, size, shape, structural properties, and chemical composition of an object. The sorter 60A compares objects to user-defined accept/reject criteria to identify and separate products of different types of materials. Optical sorting achieves non-destructive, almost 100 percent inspection and sorting at full production volumes. Compared to manual sorting, which is subjective and inconsistent, optical sorting helps improve product quality, maximize throughput, and increase yields while reducing labor costs.

Figure 3:
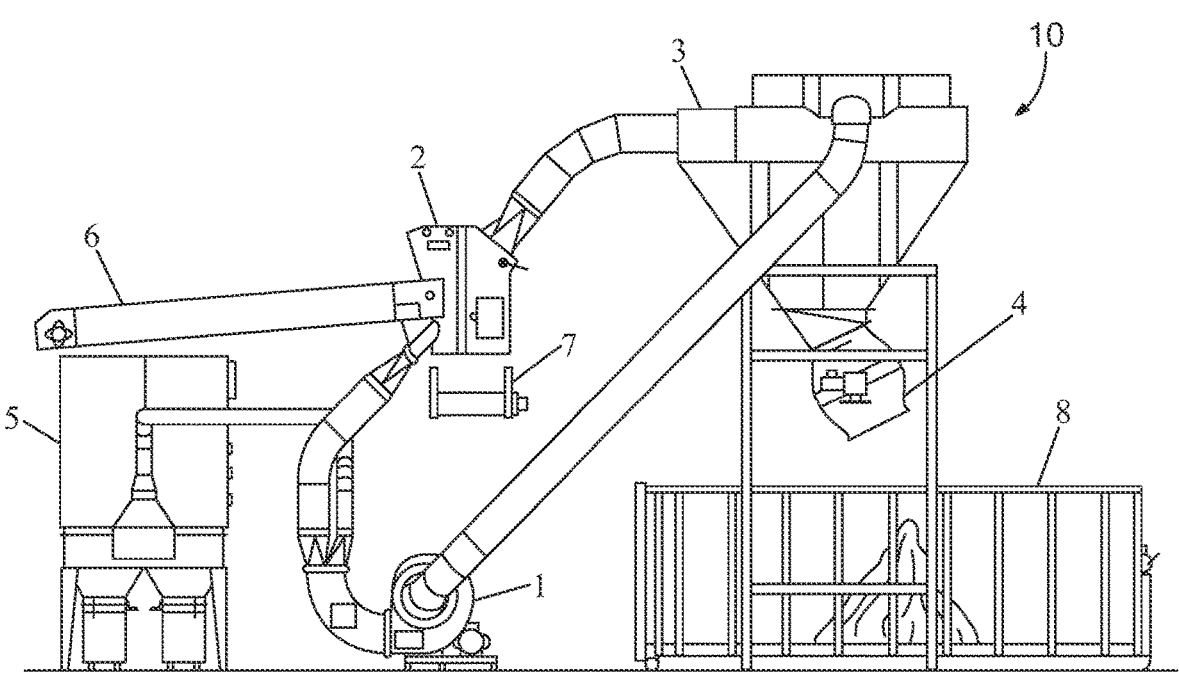
FIG. 3 depicts an example embodiment of an air separation device that can be used in the process according to the present disclosure.

In another embodiment, as illustrated in FIG. 3, an air separation device 10 is used. The air separation device 10 applies variable airflow and variable vacuum to control separation of materials of different density including, but not limited to light fraction (plastic) from heavy fraction (OCC). A suitable air separator 10 is available from Walair B.V. of The Netherlands. The air separation device 10 is configured to split or separate a waste stream into a heavy fraction and a light fraction stream.

The example air separation device 10 operates as follows. A fast-running input conveyor 6 delivers the waste material 20A, after the plastic films have been removed from the waste material 20A in step 50, to a horizontal air separator 2. The input conveyor 6 may have an effective width of about 1,200 millimeters. The speed of the input conveyor 6 may be adjustable between 80-120 meters/minute. The air separator 2 includes an air transport duct. The separation of the light from the heavy fractions takes place as the combined materials fall (under the force of gravity) in an adjustable airstream of the air separator 2. A short chute of the air separator 2 transports the heavy fraction to a heavy fraction conveyor 7, which directs the heavy fraction (OCC) away from the air separator 2.

The separated light fraction (plastic) is transported by a round transport duct to a material separator 3 where the air and the light fraction are separated. The material separator 3 is installed on a steel support beam. The material separator 3 includes an expansion area with a chute and a rotary valve 4. The rotary valve 4 transports the light fraction, without pressure, to a light fraction conveyor or container 8.

The air outlet opening of the material separator 3 is connected by a suction duct to a fan separator 1. The outlet of the fan separator 1 is connected by an air regulation valve to both the blow inlets of an air sieve. The air/dust outlet of the fan separator 1 is connected by a transport duct to a dust filter 5. In this closed circuit the fractions are transported without touching the ducts or the fan separator 1. Thus, the risk of blocking or wearing the components of the air separation device 10 is reduced to a minimum.

It is possible to regulate the air capacity of the fan separator 1, as desired, using two air regulation valves within the suction duct of the fan separator 1. Another option is to connect the fan separator 1 to a frequency regulator. Also the blow air to the air separator 2 and the capacity of the air/dust outlet can be adjusted by a regulation valve. The fan separator 1 sucks 100%, blows 70-80%, and transports 20-30% of the air to the dust filter 5. Applying the principles of blowing and suction, the air separation device 10 achieves an excellent separation of the light fraction (plastic) and heavy fraction (OCC) materials. The results of the separation also depend on the dosage and distribution of the supplied fractions to the input conveyor 6.

Regardless of how the fifth step 60 of the process 100 is implemented, whether using the optical sorter 60A, the air separation device 10, or other equipment, at the completion of the step 60 the residual plastic is separated from the OCC stream. Thus, in step 70 of the process 100 a film-rich recycled plastic 70A is created and in step 80 of the process 100 a clean recycled OCC 80A is created. The clean recycled OCC 80A has a purity of at least about 95%.

Figure 4:
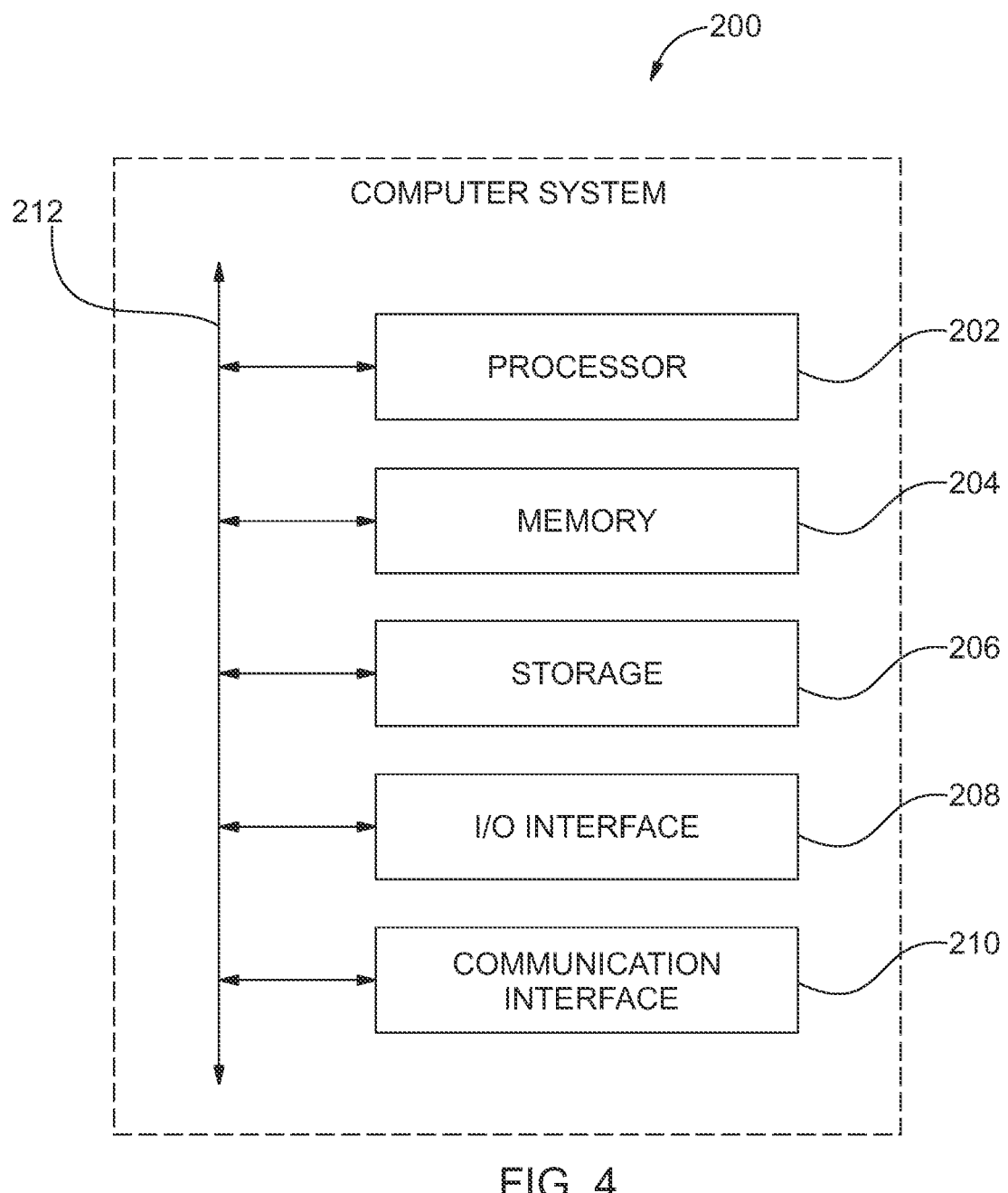
FIG. 4 illustrates an example computer system that can be used in the process according to the present disclosure.

FIG. 4 illustrates an example computer system 200 that can be used in the process 100. In other words, the computer system 200 can be used to control the various components (e.g., the sorter 30A if mechanical, the shredder 40A, the grabber 50A, the optical sorter 60A, the air separation device 10—and the subcomponents and functionality of these various components) that combine to perform the process 100.

In particular embodiments, one or more computer systems 200 perform one or more steps of one or more embodiments of the process 100 described or illustrated in this document. In particular embodiments, one or more computer systems 200 provide functionality described or illustrated in this document. In particular embodiments, software running on one or more computer systems 200 performs one or more steps of one or more embodiments of the process 100 described or illustrated in this document or provides functionality described or illustrated in this document. Particular embodiments include one or more portions of one or more computer systems 200. In this document, reference to a computer system may encompass a computing device, and vice versa, where appropriate. Moreover, reference to a computer system may encompass one or more computer systems, where appropriate.

This disclosure contemplates any suitable number of computer systems 200. This disclosure contemplates the computer system 200 taking any suitable physical form. As example and not by way of limitation, the computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these devices. Where appropriate, the computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more embodiments of the process 100 described or illustrated in this document. As an example and not by way of limitation, the one or more computer systems 200 may perform in real time or in batch mode one or more steps of one or more embodiments of the process 100 described or illustrated in this document. The one or more computer systems 200 may perform at different times or at different locations one or more steps of one or more embodiments of the process 100 described or illustrated in this document, where appropriate.

In particular embodiments, the computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 202 includes hardware for executing instructions, such as those making up a computer program. As an example and not by way of limitation, to execute instructions, the processor 202 may retrieve (or fetch) the instructions from an internal register, an internal cache, the memory 204, or the storage 206; decode and execute them; and then write one or more results to an internal register, an internal cache, the memory 204, or the storage 206. In particular embodiments, the processor

202 may include one or more internal caches for data, instructions, or addresses. This disclosure contemplates the processor 202 including any suitable number of any suitable internal caches, where appropriate. As an example and not by way of limitation, the processor 202 may include one or more instruction caches, one or more data caches, and one or more translation lookaside buffers (TLBs). Instructions in the instruction caches may be copies of instructions in the memory 204 or the storage 206, and the instruction caches may speed up retrieval of those instructions by the processor 202. Data in the data caches may be copies of data in the memory 204 or the storage 206 for instructions executing at the processor 202 to operate on; the results of previous instructions executed at the processor 202 for access by subsequent instructions executing at the processor 202 or for writing to the memory 204 or the storage 206; or other suitable data. The data caches may speed up read or write operations by the processor 202. The TLBs may speed up virtual-address translation for the processor 202. In particular embodiments, the processor 202 may include one or more internal registers for data, instructions, or addresses. This disclosure contemplates the processor 202 including any suitable number of any suitable internal registers, where appropriate. Where appropriate, the processor 202 may include one or more arithmetic logic units (ALUs); be a multi-core processor; or include one or more processors 202. Although this disclosure describes and illustrates a particular processor, this disclosure contemplates any suitable processor.

In particular embodiments, the memory 204 includes main memory for storing instructions for the processor 202 to execute or data for the processor 202 to operate on. As an example and not by way of limitation, the computer system 200 may load instructions from the storage 206 or another source (such as, for example, another computer system 200) to the memory 204. The processor 202 may then load the instructions from the memory 204 to an internal register or internal cache. To execute the instructions, the processor 202 may retrieve the instructions from the internal register or internal cache and decode them. During or after execution of the instructions, the processor 202 may write one or more results (which may be intermediate or final results) to the internal register or internal cache. The processor 202 may then write one or more of those results to the memory 204. In particular embodiments, the processor 202 executes only instructions in one or more internal registers or internal caches or in the memory 204 (as opposed to the storage 206 or elsewhere) and operates only on data in one or more internal registers or internal caches or in the memory 204 (as opposed to the storage 206 or elsewhere). One or more memory buses (which may each include an address bus and a data bus) may couple the processor 202 to the memory 204. The bus 212 may include one or more memory buses, as described below. In particular embodiments, one or more memory management units (MMUs) reside between the processor 202 and the memory 204 and facilitate access to the memory 204 requested by the processor 202. In particular embodiments, the memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. The memory 204 may include one or more memories 204, where appropriate. Although this disclosure describes and illustrates particular memory, this disclosure contemplates any suitable memory.

In particular embodiments, the storage 206 includes mass storage for data or instructions. As an example and not by way of limitation, the storage 206 may include a hard disk drive (HDD), a floppy disk drive, flash memory, an optical disc, a magneto-optical disc, magnetic tape, or a Universal Serial Bus (USB) drive or a combination of two or more of these. The storage 206 may include removable or non-removable (or fixed) media, where appropriate. The storage 206 may be internal or external to the computer system 200, where appropriate. In particular embodiments, the storage 206 is non-volatile, solid-state memory. In particular embodiments, the storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the storage 206 taking any suitable physical form. The storage 206 may include one or more storage control units facilitating communication between the processor 202 and the storage 206, where appropriate. Where appropriate, the storage 206 may include one or more storages 206. Although this disclosure describes and illustrates particular storage, this disclosure contemplates any suitable storage.

In particular embodiments, the I/O interface 208 includes hardware, software, or both, providing one or more interfaces for communication between the computer system 200 and one or more I/O devices. The computer system 200 may include one or more of these I/O devices, where appropriate. One or more of these I/O devices may enable communication between a person and the computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 208 for them. Where appropriate, the I/O interface 208 may include one or more device or software drivers enabling the processor 202 to drive one or more of these I/O devices. The I/O interface 208 may include one or more I/O interfaces 208, where appropriate. Although this disclosure describes and illustrates a particular I/O interface, this disclosure contemplates any suitable I/O interface.

In particular embodiments, the communication interface 210 includes hardware, software, or both providing one or more interfaces for communication (such as, for example, packet-based communication) between the computer system 200 and one or more other computer systems 200 or one or more networks. As an example and not by way of limitation, the communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, the computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. The computer system 200 may include any suitable communication interface 210 for any of these networks, where appropriate. The communication interface 210 may include one or more communication interfaces 210, where appropriate. Although this disclosure describes and illustrates a particular communication interface, this disclosure contemplates any suitable communication interface.

In particular embodiments, the bus 212 includes hardware, software, or both coupling components of the computer system 200 to each other. As an example and not by way of limitation, the bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus 212 may include one or more buses 212, where appropriate. Although this disclosure describes and illustrates a particular bus, this disclosure contemplates any suitable bus or interconnect.

In this document, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of the processor 202 (such as, for example, one or more internal registers or caches), one or more portions of the memory 204, one or more portions of the storage 206, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. In this document, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), JavaScript Object Notation (JSON) or other suitable markup language.

Whether implemented using the computer system 200 or not, the automated process 100 offers a number of advantages. Among those advantages is that the process 100 enables involuntary generators to recycle common plastics along with used cardboard in a common container. The process 100 shreds a mix of recyclable waste materials 20A including, but not limited to, a wide variety of cardboard and plastics (LLDPE, LDPE, HDPE, PP, PS). The process 100 provides an automated separation of a mix of recyclable commodities, including but not limited to OCC, film, plastic pallets, packaging crates, buckets, drums, and more. The process 100 provides feedstock and acts as a source for a variety of downstream recycling methods including but not limited to mechanical, chemical (pyrolysis, gasification), solvent, and biological treatment. Without the process 100, these downstream recycling methods will not get a recyclable feedstock from mixed commercial and industrial waste streams.

Figure 5:
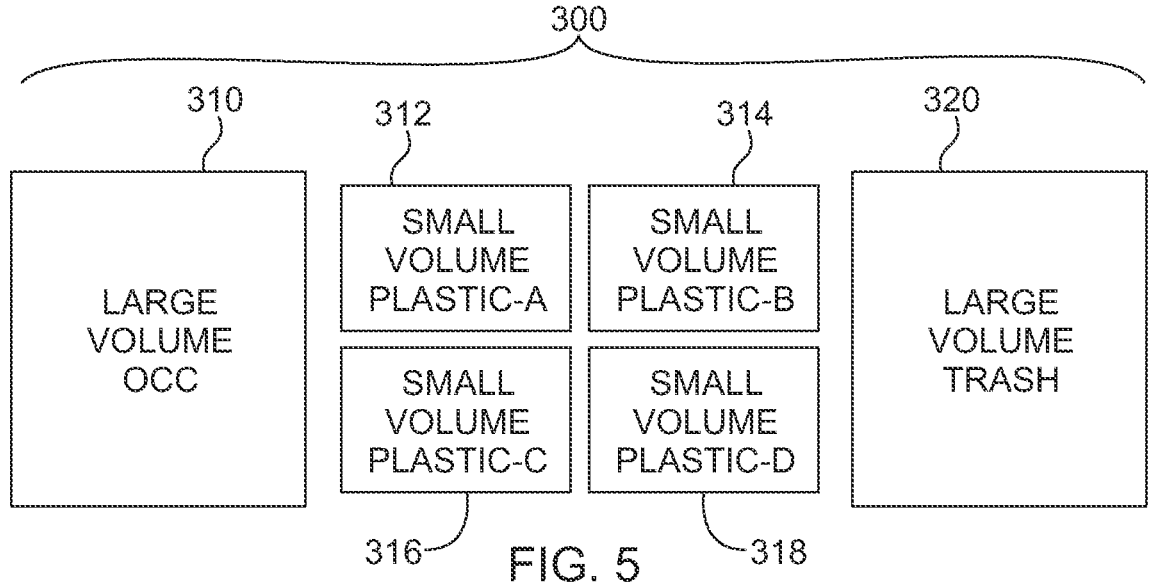
FIG. 5 depicts a large volume OCC, a small volume plastic A, a small volume plastic B, a small volume plastic C, a small volume plastic D, and a large volume trash in a common receptacle.

The process 100 also offers the real-time ability to recycle small volume items (e.g., films, crates, pallets, drums, and the like) alongside large volume OCC in a common receptacle. This advantage of the process 100 is explained with the help of FIG. 5, which depicts a large volume OCC 310; a small volume plastic A 312, a small volume plastic B 314, a small volume plastic C 316, and a small volume plastic D 318; and a large volume trash 320 in a common receptacle 300. There are essentially four options to address the contents of the common receptacle 300. One option, and a current procedure, is not to recycle at all. Rather, the contents of the small volume plastic A 312, the small volume plastic B 314, the small volume plastic C 316, the small volume plastic D 318, and the large volume trash 320 are simply discarded. The advantage of this option is that implementation is easy.

A second option is to accumulate the small volume plastic A 312, the small volume plastic B 314, the small volume plastic C 316, and the small volume plastic D 318. The accumulation is aggregated and densified on site by a generator. This option recycles, but is relatively difficult to implement.

A third option is to recycle in small volumes. The small volume plastic A 312, the small volume plastic B 314, the small volume plastic C 316, and the small volume plastic D 318 are shipped in combination loads to a local recycler. This option recycles, but is relatively expensive to implement.

The process 100 offers a fourth option. The small volume plastic A 312, the small volume plastic B 314, the small volume plastic C 316, and the small volume plastic D 318 are processed in the large volume OCC 310. This option recycles relatively easily and is relatively inexpensive and cost effective to implement.

Because the step 70 of the process 100 creates a film-rich recycled plastic 70A, the process 100 further achieves a number of plastics-related advantages. These advantages of the process 100 are explained with the help of FIGS. 6 and 7.

Figure 6:
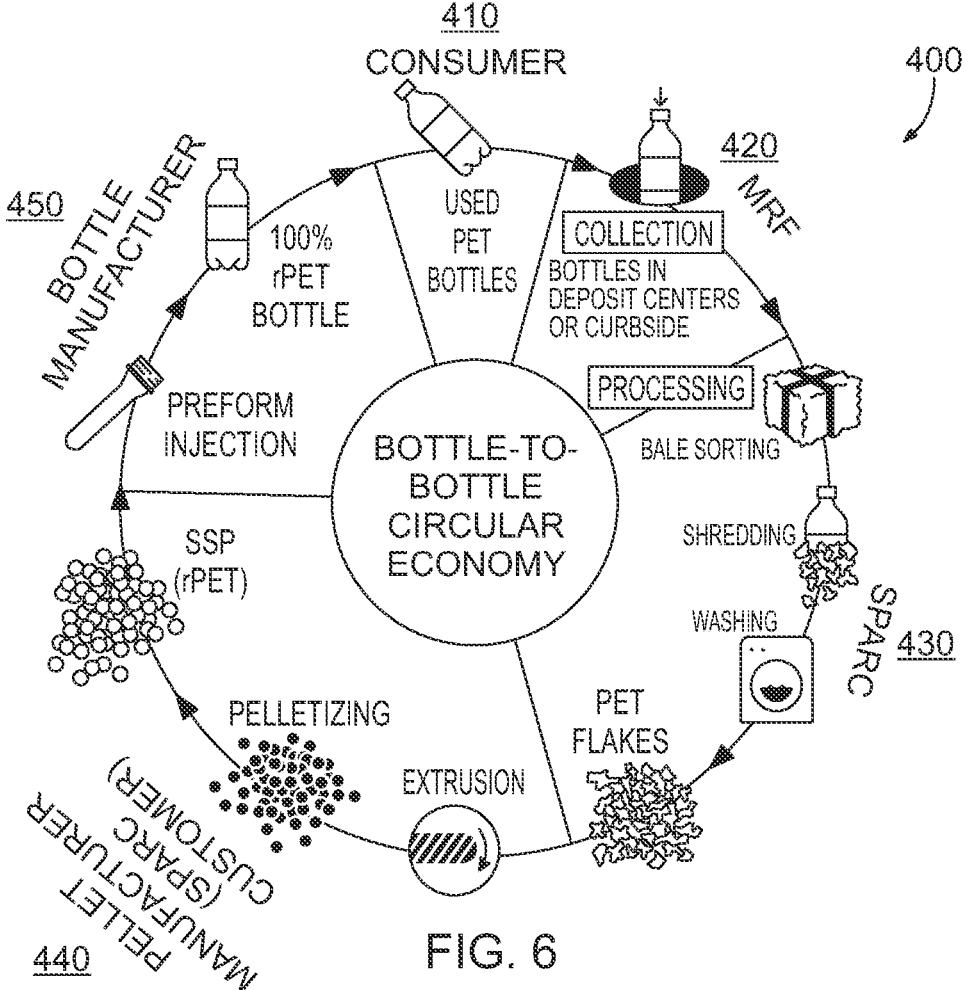
FIG. 6 illustrates an ecosystem for the circular plastic bottle economy, focusing on recycling beverage bottles made of polyethylene terephthalate.

FIG. 6 illustrates an ecosystem 400 for the circular plastic bottle economy, focusing on recycling beverage bottles made of polyethylene terephthalate ("PET"). PET is one of the few thermoplastics that can be recycled to achieve resin-like quality through solid state polycondensation ("SSP"). The cycle begins when a consumer 410 disposes properly of a used PET bottle. A materials recovery facility ("MRF") 420 collects the bottles (typically in deposit centers or curbside). The collected bottles are then processed into PET flakes. Such processing occurs at a secondary plastics automated recycling center ("SPARC") 430.

The SPARC 430 allows the operator to step into mechanical reprocessing, freeing pellet manufacturers to focus on their core competencies around the SSP process. The SPARC 430 does this at scale, freeing-up currently encumbered assets and production floor space at pellet manufacturers—unlocking value for them. In addition, the SPARC 430 creates ecosystem efficiencies as current pellet manufacturers treat non-targeted plastic resins as residual. The SPARC 430 provides leverage and scale for capturing upside value for recycled plastics.

FIG. 6 shows some of the steps of an example process flow for recycling PET. Those steps include: (1) de-baling in which bales of PET are loaded and separated; (2) optical sorting in which near-infrared (NIR) cameras detect PET on a conveyor belt; (3) label and sleeve removal in which labels and sleeves are removed; (4) second optical sorting in which clear and color PET are separated; (5) manual picking in which any remaining unwanted material is removed; (6) granulation in which PET is cut into flakes (e.g., 12 mm in size); (7) washing and drying in which the flakes are washed and separated by density; and (8) flake sorting and bagging in which the flakes are sorted by size and color and bagged. Thereafter, the PET flakes are sent to a pellet manufacturer 440, i.e., a customer of the operator of the SPARC 430. The pellet manufacturer 440 melts the flakes and cuts them into food-grade pellets. After pelletizing, SSP creates the recycled PET (or "rPET") that the bottle manufacturer 450 uses to make a new bottle and complete the cycle.

In short, rPET takes plastic that has already been created, usually plastic bottles, and chops the bottles into tiny flakes. These flakes are then melted to separate the core PET ingredient inside of the bottle. This PET can then be used to make anything from a sweater to another plastic bottle. Not only is up to 50% less energy used than making PET from scratch, but by using existing bottles already created, it ensures these bottles do not end up in landfill. It also means that the planet remains as it is: rather than obtaining the core ingredient via the highly damaging process of crude oil primary extraction, use is made of a product in abundance that may otherwise have directly contributed to landfill.

Although FIG. 6 focuses on the ecosystem 400 and one example of recycling PET bottles, an artisan will readily recognize the advantages achieved using the process 100 of the subject disclosure in the ecosystem 400. The MRF 420 is not limited to collecting bottles; rather, the process 100 accepts a mix of waste material 20A which would include bottles. Further, because bales are not needed in the implementation of the process 100, there is no need to load and separate the non-existent bales.

The process 100 enables a huge opportunity to convert previously unrecyclable plastics to commercial, industrial-grade products including but not limited to food, medical, and chemical applications. The operators of the process 100 will be able to drive plastics circularity by manufacturing recycled products. The applications include but are not limited to consumer packaging, industrial pyrolysis oil, durable goods, films, pellets, and the like.

The process 100 enables plastic credits between the manufacturers, consumers, users, and recyclers of plastics. Recovering LDPE film that would otherwise be landfilled creates plastic waste recycling credits under a certified standard including but not limited to the Verra Plastic Waste Reduction Standard which sets a standard to establish criteria to create plastic credit. See https://verra.org. Verra develops and manages standards that are globally applicable and advance action across a wide range of sectors and activities. The Verra standards and programs are trusted by a broad range of stakeholders, provide innovative solutions to environmental and social problems, and work for people and the planet by supporting projects and activities that deliver a range of benefits to communities and their surrounding environments.

Figure 7:
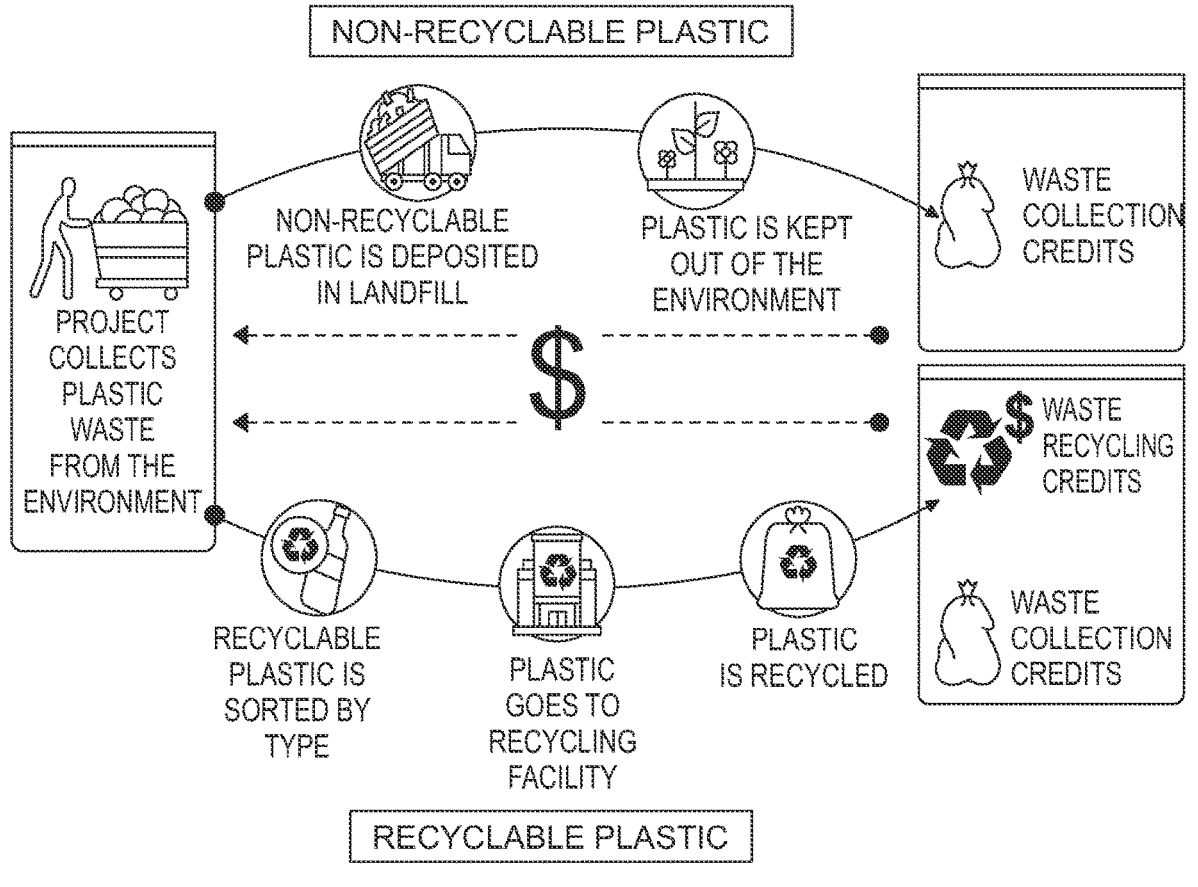
FIG. 7 illustrates the flow of material and credits in a Verra Plastic Standard project example in which plastic waste is collected from the environment.

The Verra Plastic Program projects include a range of plastic waste collection and recycling activities that reduce the amount of plastic waste in the environment and the use of virgin plastic. FIG. 7 illustrates the flow of material and credits in a Plastic Standard project example in which plastic waste is collected from the environment. In this example, the non-recyclable plastic waste is sent to a landfill resulting in Waste Collection Credits and the recyclable plastic waste is sent to a recycler resulting in both Waste Collection Credits and Waste Recycling Credits.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure.

What is claimed:

1. An automated process for separating and recycling a broad mix of waste material including industrial and commercial streams, the process comprising:
    collecting the broad mix of waste material;
    sorting the broad mix of waste material to remove contamination from the broad mix of waste material;
    shredding the broad mix of waste material;
    removing plastic film from the broad mix of waste material, creating a stream of:
        (a) plastic film wherein the plastic film is less than 0.010 inches thick, and
        (b) a separate stream of dirty cardboard; and
    separating, with an optical sorter, residual plastic from the stream of dirty cardboard wherein the residual plastic is directed to either the plastic stream or an independent third stream,
    wherein separate streams of the residual plastic and a clean recycled cardboard each having a purity of at least about 95% are created.

2. The automated process according to claim 1, wherein the broad mix of waste material is collected into at least one of a container, a stationary compactor, and a self-contained compactor.

3. The automated process according to claim 1, further comprising the step of compacting the broad mix of waste material after the broad mix of waste material is collected.

4. The automated process according to claim 1, wherein the broad mix of waste material includes cardboard, plastic, and trash.

5. The automated process according to claim 1, wherein the stream of plastic film includes polyester and polyolefin.

6. The automated process according to claim 1, further comprising:
    cutting the stream of plastic film into flakes;
    pelletizing the flakes into pellets; and
    subjecting the pellets to solid state polycondensation.

7. The automated process according to claim 1, wherein the contamination or the independent third stream includes non-recyclable plastic, and the process further comprises:
    sending the non-recyclable plastic to a landfill resulting in waste collection credits under a certified standard; and
    sending the stream of plastic film to a recycler resulting in both waste collection credits and waste recycling credits under a certified standard.

8. A system for separating and recycling a broad mix of waste material including industrial and commercial streams, the system comprising:
    at least one of a container, a stationary compactor, and a self-contained compactor into which the broad mix of waste material is collected;
    a sorter for sorting the broad mix of waste material to remove contamination from the broad mix of waste material;
    a shredder for coarsely shredding the broad mix of waste material; and
    at least one optical sorter and an air separation device for separating plastic film, wherein the plastic film is less than 0.010 inches thick, from the broad mix to create a stream of cardboard and
        including the plastic film either in a stream of film-rich recycled plastic or in an independent third stream, wherein the stream of film-rich recycled plastic and the stream of cardboard each have a purity of at least about 95%.

9. The system according to claim 8, wherein the broad mix of waste material includes cardboard, plastic, and trash.

10. The system according to claim 8, wherein the separate stream of film-rich recycled plastic includes polyester and polyolefin.

11. The system according to claim 8, further comprising a secondary plastics automated recycling center for cutting the plastic film contained in the film-rich recycled plastic stream into flakes.

12. The system according to claim 11, further comprising a pelletizer for pelletizing the flakes into pellets, subjecting the pellets to solid state polycondensation, and creating a recycled product.

13. The system according to claim 12, further comprising a manufacturing facility for accepting the recycled product and manufacturing a new product.

14. The system according to claim 8, wherein the contamination or the independent third stream includes non-recyclable plastic, the system further comprising a landfill receiving the non-recyclable plastic which results in waste collection credits under a certified standard.

15. The system according to claim 14, further comprising a recycler receiving the film-rich recycled plastic stream which results in both waste collection credits and waste recycling credits under a certified standard.

16. One or more computer-readable non-transitory storage media embodying software that is operable when executed to:
    collect a broad mix of waste material including industrial and commercial streams;
    sort the broad mix of waste material to remove contamination from the broad mix of waste material;

19

20 shred the broad mix of waste material;

remove plastic film, wherein the plastic film removed is less than 0.010 inches thick, from the broad mix of waste material with an optical sorter, creating a stream of plastic film and a separate stream of dirty cardboard; and separate residual plastic from the stream of dirty cardboard and include that residual plastic either in the plastic stream or in an independent third stream, wherein separate streams of a film-rich recycled plastic and a clean recycled cardboard each having a purity of at least about 95% are created.

* * * * *